United States Patent
Tsutsui

(10) Patent No.: US 9,678,538 B2
(45) Date of Patent: Jun. 13, 2017

(54) ELECTRONIC APPARATUS

(71) Applicant: KABUSHIKI KAISHA TOSHIBA, Minato-ku, Tokyo (JP)

(72) Inventor: Tomonori Tsutsui, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/851,151

(22) Filed: Sep. 11, 2015

(65) Prior Publication Data

US 2016/0085283 A1    Mar. 24, 2016

Related U.S. Application Data

(60) Provisional application No. 62/052,772, filed on Sep. 19, 2014.

(51) Int. Cl.
*G06F 1/16* (2006.01)
*G06F 1/32* (2006.01)

(52) U.S. Cl.
CPC ............ *G06F 1/1632* (2013.01); *G06F 1/165* (2013.01); *G06F 1/1635* (2013.01); *G06F 1/1669* (2013.01); *G06F 1/3212* (2013.01)

(58) Field of Classification Search
CPC .... G06F 1/1632; G06F 1/1669; G06F 1/1635; G06F 1/165; G06F 1/3212; G06F 1/3262; G06F 1/3271; Y02B 60/1292
See application file for complete search history.

(56) References Cited

U.S. PATENT DOCUMENTS

| 6,014,141 A * | 1/2000 | Klein | G06F 1/1616 345/3.1 |
|---|---|---|---|
| 6,295,002 B1 | 9/2001 | Fukuda | |
| 6,392,383 B1 * | 5/2002 | Takimoto | G06F 1/1632 320/115 |
| 2005/0233205 A1 * | 10/2005 | Koike | G06F 1/1616 429/90 |
| 2008/0203817 A1 * | 8/2008 | Luo | G06F 1/1616 307/64 |
| 2010/0039764 A1 * | 2/2010 | Locker | G06F 1/1615 361/679.29 |
| 2015/0058648 A1 * | 2/2015 | Oh | G06F 1/3206 713/323 |
| 2015/0077123 A1 * | 3/2015 | Guo | G06F 1/266 324/426 |

FOREIGN PATENT DOCUMENTS

| JP | 2000-332644 A | 11/2000 |
|---|---|---|
| JP | 2001-175229 A | 6/2001 |
| JP | 2002-032980 A | 1/2002 |
| JP | 2002-149289 A | 5/2002 |

* cited by examiner

*Primary Examiner* — Dennis M Butler
(74) *Attorney, Agent, or Firm* — Foley & Lardner LLP

(57) ABSTRACT

An electronic apparatus includes an expansion unit having a battery. The electronic apparatus includes a controller and a display. The controller performs power management of the battery. The display displays a residual capacity of the battery. The controller controls the display such that the display performs pattern display based on the residual capacity.

2 Claims, 8 Drawing Sheets

ELECTRONIC APPARATUS

CROSS-REFERENCE TO RELATED APPLICATION

This application claims priority from U.S. Provisional Patent Application No. 62/052,772 filed on Sep. 19, 2014, the entire contents of which are incorporated herein by reference.

FIELD

Embodiments of the present invention relate to an electronic apparatus having an expansion unit.

BACKGROUND

In some models of 2-in-1 laptop (personal computer (PC)) systems, a tablet and a keyboard dock are equipped with batteries, respectively. Every display-related function is on the tablet side. Therefore, in a case where the tablet is detached from the keyboard dock, it is impossible to easily see the capacity of the battery by only the keyboard dock. For this reason, it is demanded to make it possible to easily perform battery capacity display in a single keyboard dock. However, any means for realizing that demand is not known.

DETAILED DESCRIPTION

According to one embodiment, an electronic apparatus includes an expansion unit having a battery. The electronic apparatus includes a controller and a display. The controller performs power management of the battery. The display displays a residual capacity of the battery. The controller controls the display such that the display performs pattern display based on the residual capacity.

Various embodiments will be described hereinafter with reference to the accompanying drawings.

First Embodiment

A first embodiment will be described with reference to FIGS. 1 to 9B.

Figure 1:
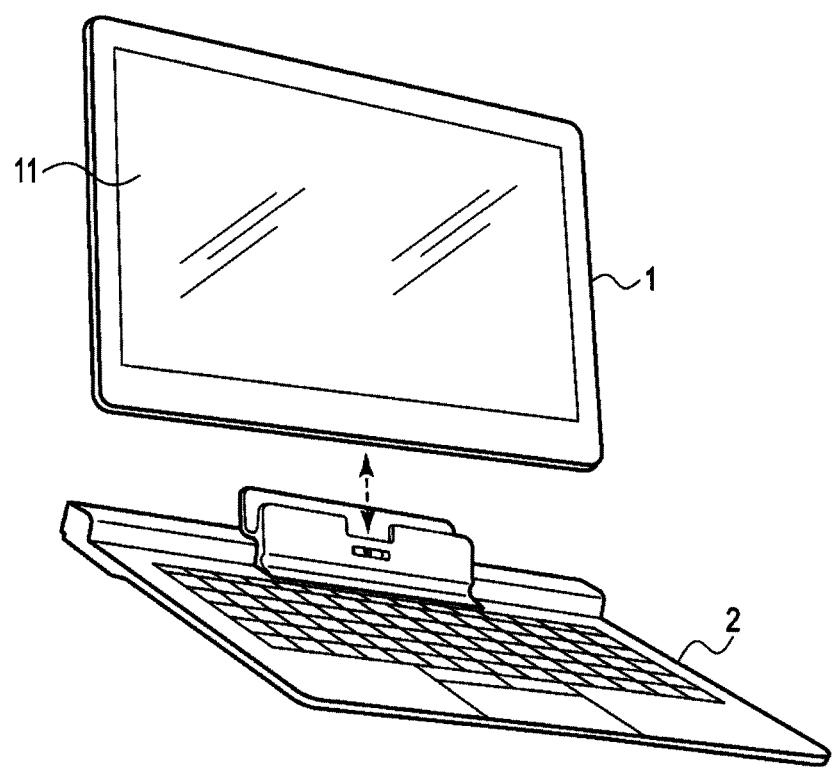
FIG. 1 is a perspective view illustrating the external appearance of an electronic apparatus of an embodiment.

FIG. 1 is a perspective view illustrating the external appearance of an electronic apparatus according to an embodiment. The electronic apparatus is, for example, a mobile electronic apparatus which allows a user to perform handwriting input with a pen or a finger. On the assumption that the electronic apparatus has been realized as a tablet computer 1, the following description will be made.

The tablet computer 1 includes a touch screen display 11 as shown in FIG. 1. The touch screen display 11 is mounted so as to overlap the upper surface of the tablet computer 1. The touch screen display 11 includes a flat panel display, and a sensor which is configured so as to detect a position on the screen of the flat panel display touched by a pen or a finger. Examples of the flat panel display include a liquid crystal display (LCD). Examples of the sensor include an electrostatic capacitance type touch panel and an electromagnetic induction type digitizer. Here, it is assumed that the touch screen display 11 includes both of two kinds of sensors, that is, a digitizer and a touch panel.

Figure 2:
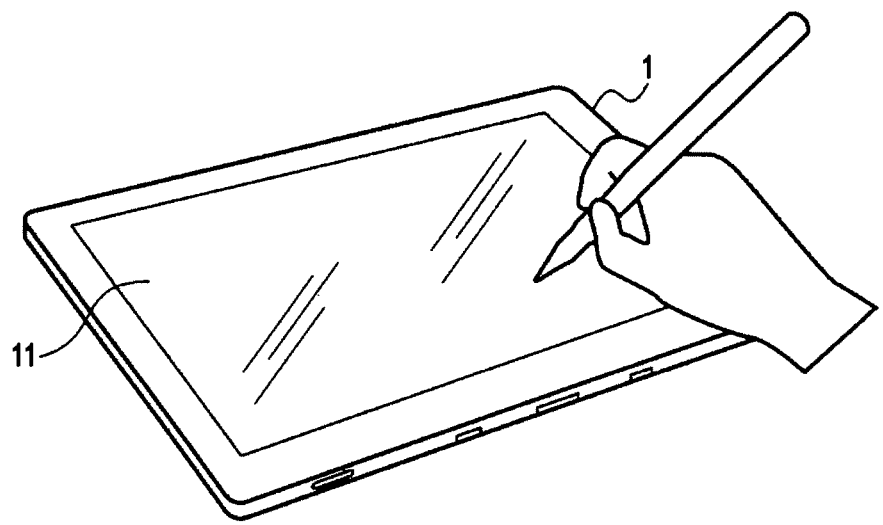
FIG. 2 is a view illustrating a first use style of the electronic apparatus of the embodiment.
Figure 3:
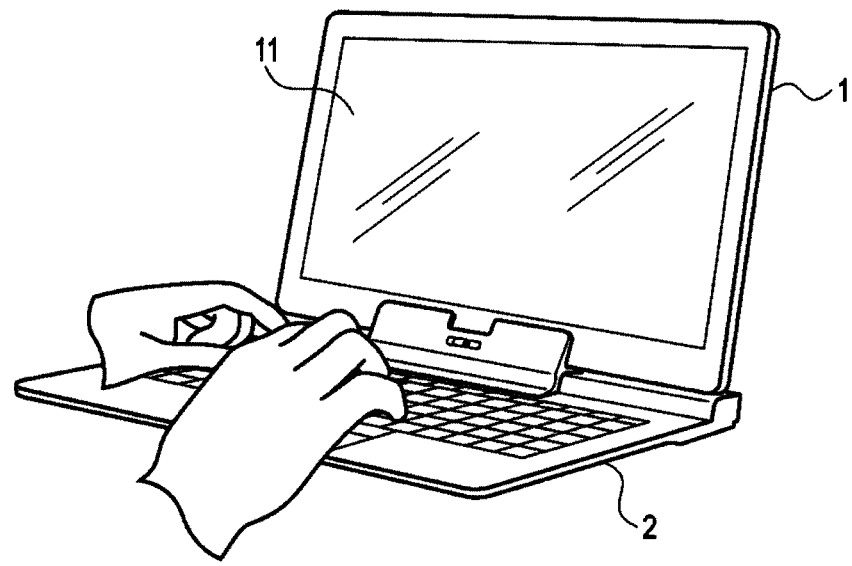
FIG. 3 is a view illustrating a second use style of the electronic apparatus of the embodiment.

Also, the tablet computer 1 is configured so as to be connected to or disconnected from an expansion unit 2 including a keyboard, as needed, as shown in FIG. 1. Hereinafter, the expansion unit 2 will be referred to as the keyboard dock 2. That is, it is possible to use the tablet computer 1 in two styles of a single tablet computer state (where the tablet computer is not connected to the keyboard dock) as shown in FIG. 2 and a state where the tablet computer is connected to the keyboard dock 2 as shown in FIG. 3. The state shown in FIG. 2 will be referred to as a tablet mode, and the state shown in FIG. 3 will be referred to as a clamshell mode or the like.

Figure 4:
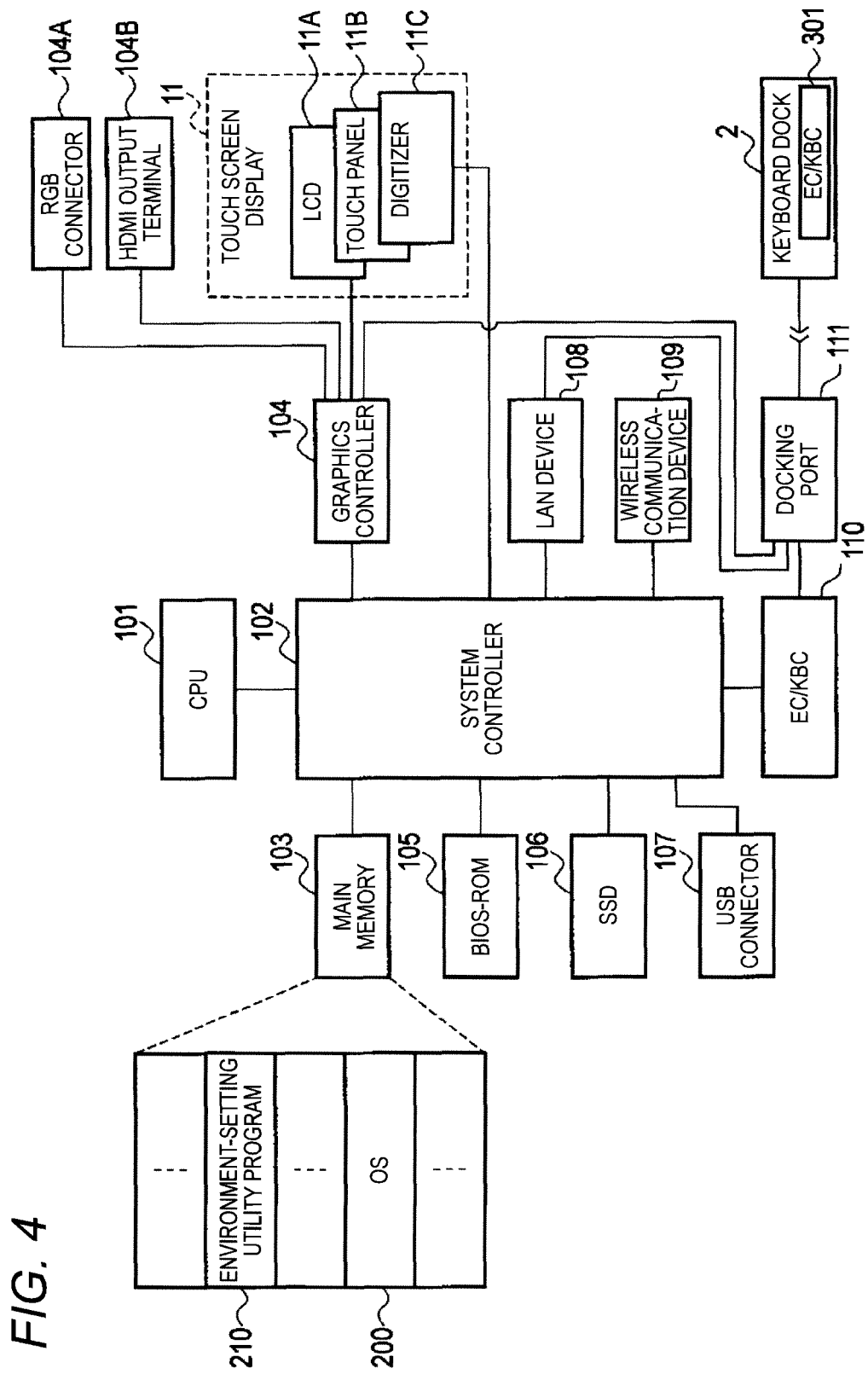
FIG. 4 is a view illustrating a system configuration of the electronic apparatus of the embodiment.

FIG. 4 is a view illustrating a system configuration of the tablet computer 1. Also, power supply control will be described including the expansion unit 2, with reference to FIG. 5.

As shown in FIG. 4, the tablet computer 1 includes a CPU 101, a system controller 102, a main memory 103, a graphics controller 104, an RGB connector 104A, an HDMI (High-Definition Multimedia Interface) (registered as a trade mark) output terminal 104B, a BIOS-ROM 105, a solid state drive (SSD) 106, a USB connector 107, a LAN device 108, a wireless communication device 109, an embedded controller/keyboard controller (EC/KBC) 110, a docking port 111, and so on.

The CPU 101 is a processor which controls operations of various modules included in the tablet computer 1. The CPU 101 loads various programs from the SSD 106 into the main memory 103, and executes those programs. The programs which are executed by the CPU 101 include an operating system (OS) 200, and an environment-setting utility program 210 which is executed under control of the OS 200 and will be described below.

Also, the CPU 101 executes a basic input/output system (BIOS [hereinafter, also referred to as BIOS 250]) stored in the BIOS-ROM 105. The BIOS 250 is a program for hardware control.

The system controller 102 is a device which is connected between a local bus of the CPU 101 and various components. The system controller 102 includes a memory controller for controlling access to the main memory 103, and a serial ATA controller for controlling access to the SSD 106. Also, the system controller 102 has a function of performing communication with the graphics controller 104 and the EC/KBC 110 through a serial bus or the like.

The graphics controller 104 is a display controller which controls an LCD 11A which is used as a display monitor of the tablet computer 1. From display data which are output by various programs, the graphics controller 104 generates display signals (LVDS signals) to be supplied to the LCD 11A. The graphics controller 104 can also generate analog RGB signals and HDMI video signals from the display data. The analog RGB signals and the HDMI video signals are supplied to an external display through the RGB connector 104A and the HDMI output terminal 104B, respectively. The HDMI output terminal 104B is a terminal capable of sending out HDMI video signals (uncompressed digital video signals) and digital audio signals by one cable. The graphics controller 104 can transmit the analog RGB signals and the HDMI video signals to the keyboard dock 2 through the docking port 111. The docking port 111 is a port for electrically connecting the tablet computer 1 and the keyboard dock 2.

The LCD 11A displays a screen image based on a display signal which is supplied from the graphics controller 104. In a layer on the LCD 11A, a touch panel 11B is disposed as a first sensor for detecting a position on the screen touched by a finger. Further, in a layer below the LCD 11A, a digitizer 11C is disposed as a second sensor for detecting a position on the screen touched by a pen. The touch panel 11B is an electrostatic capacitance type pointing device, and a portion on the screen touched by a finger, movement of the touched position, and the like are detected by the touch panel 11B. Meanwhile, the digitizer 11C is an electromagnetic induction type pointing device, and a portion on the screen touched by a pen, movement of the touched position, and the like are detected by the digitizer 11C.

The USB connector 107 is a connector for connecting a USB device such as a USB memory. The LAN device 108 is a device which performs wired communication based on a standard such as IEEE 802.3. Connection of the tablet computer 1 to a LAN is performed by connecting a LAN cable to a LAN connector of the keyboard dock 2 which is connected to the docking port 111. The wireless communication device 109 is a device which performs wireless communication based on a standard such as IEEE 802.11g.

The EC/KBC 110 is a power management controller for performing power management of the tablet computer 1, and has a function of powering on or off the tablet computer 1 in response to an operation of the user on a power button.

Also, an EC/KBC 301 is a power management controller for performing power management of the keyboard dock 2. Further, the EC/KBC 301 includes a keyboard controller which controls the keyboard mounted on the keyboard dock 2. Also, the EC/KBC 301 is configured so as to control a backlight or power state display LEDs of the keyboard dock 2.

Now, it is assumed that the tablet computer 1 is powered on in a state where the keyboard dock 2 is connected to the docking port 111. If the tablet computer 1 is powered on, the BIOS 250 performs a power on self test (POST). The BIOS 250 checks various components of the tablet computer 1 by the POST, and initializes settings with respect to the various components. In this POST, the BIOS 250 recognizes connection with the keyboard dock 2, and acquires a Dock-ID from the keyboard dock 2. Next, the tablet computer 1 activates the OS 200. If the OS 200 is activated, in the tablet computer 1, the environment-setting utility program 210 is activated under control of the OS 200.

If the environment-setting utility program 210 is activated, it first acquires the Dock-ID of the keyboard dock 2 from the BIOS 250.

Figure 5:
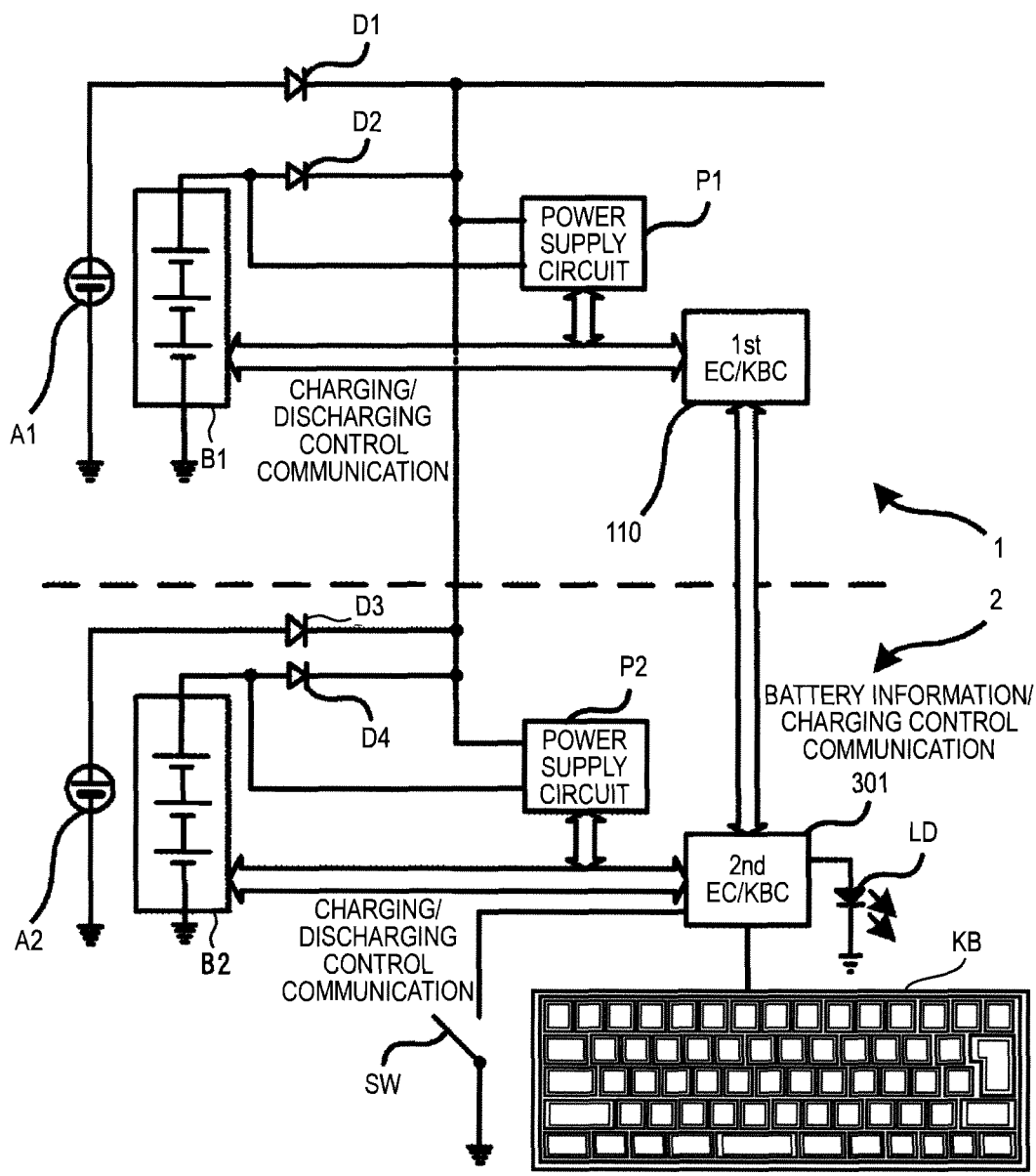
FIG. 5 is a view illustrating a configuration of a main portion of the embodiment.

FIG. 5 is a view illustrating a functional configuration of a main portion of the embodiment.

In the tablet computer 1, a constant voltage source A1 is produced by, for example, an AC adapter which uses commercial alternate current and is connected as an external power supply (not shown). The AC adapter is configured by elements such as a transformer, a rectifying unit using a diode bridge, and a smoothing capacitor. The output of the constant voltage source A1 and the output of a battery B1 join each other through a diode D1 and a diode D2, respectively, and a higher voltage of two output voltages is selected and is involved in supply of electric power to a power supply circuit P1. The power supply circuit P1 generates electric power (an operation power supply) to be supplied to each component of the electronic apparatus.

The (1st) EC/KBC 110 is configured so as to perform charging/discharging control communication with the battery B1 and the power supply circuit P1. For example, in order to charge the battery B1, firmware of the EC/KBC 110 determines the state of a gas gauge IC (not shown) included in the battery B1 while determining start or stop of charging of the battery B1. The gas gauge IC is an IC configured so as to provide information on various states of battery cells included in the battery B1 to a host (the above described firmware).

Also, even in the keyboard dock 2, similarly, the output of a constant voltage source A2 and the output of a battery B2 join each other through a diode D3 and a diode D4, respectively, and a higher voltage of two output voltages is selected and is involved in supply of electric power to a power supply circuit P2. However, since the constant voltage source A1 and the constant voltage source A2 are identical to each other, it is general that they are not used at the same time.

The (2nd) EC/KBC 301 is configured so as to perform charging/discharging control communication with the battery B2 and the power supply circuit P2. Also, the EC/KBC 301 controls a keyboard KB and lightening of LEDs LD. The keyboard KB is configured so as to include a backlight (not shown), and the backlight is configured so as to be turned on by the EC/KBC 301. Also, a switch SW is for setting sharing of the IIC interface (to be described below) between a master device and a slave device, for example, by the environment-setting utility program 210.

The above described diode group is connected through the docking port 111 as shown in FIG. 5, and both EC/KBCs are configured so as to perform battery information/charging control communication.

Figure 6:
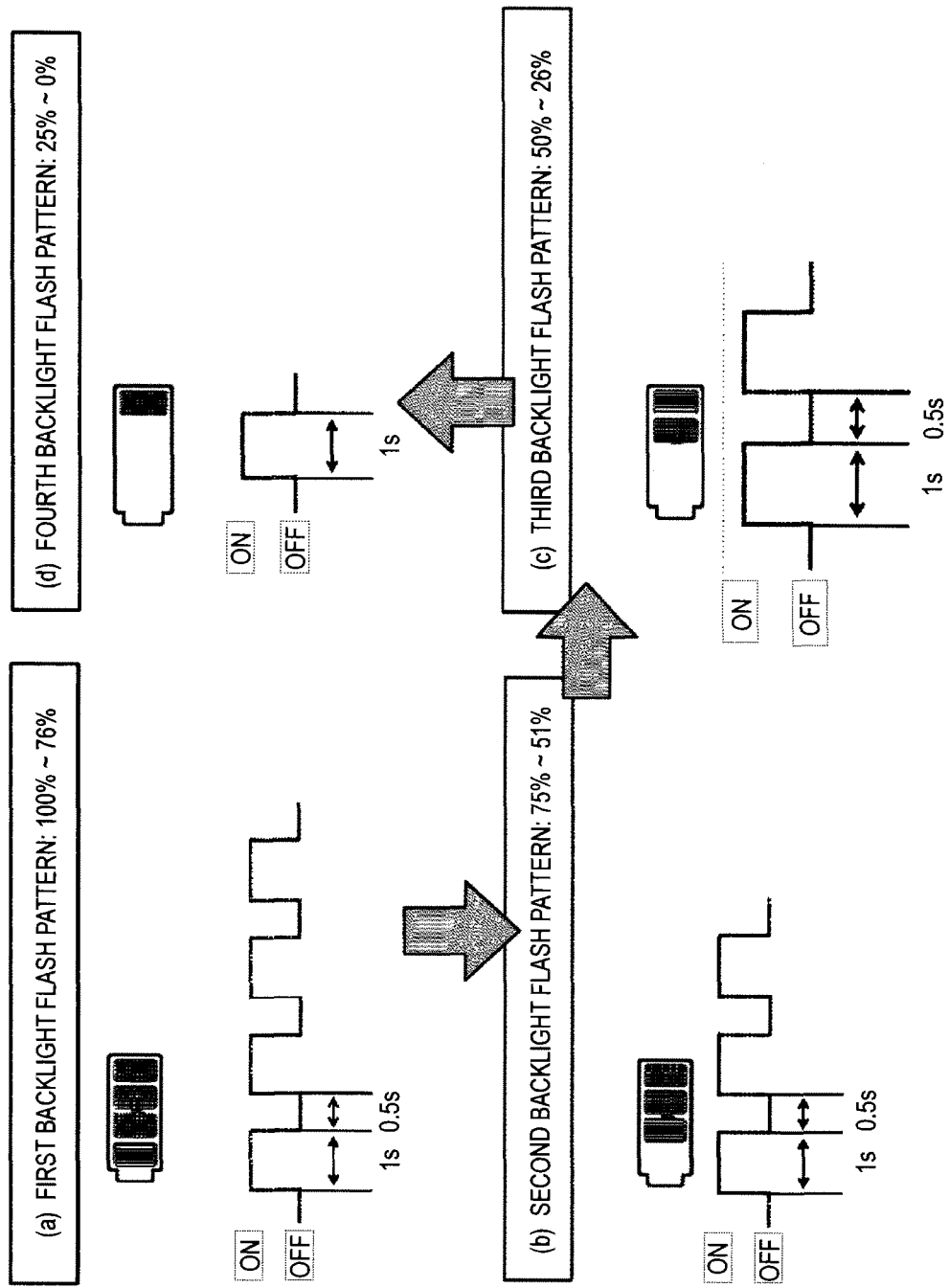
FIG. 6 is a view for explaining an operation of the embodiment.

FIG. 6 is a view for explaining an operation of the embodiment, and will be described below together with FIG. 8.

Figure 7:
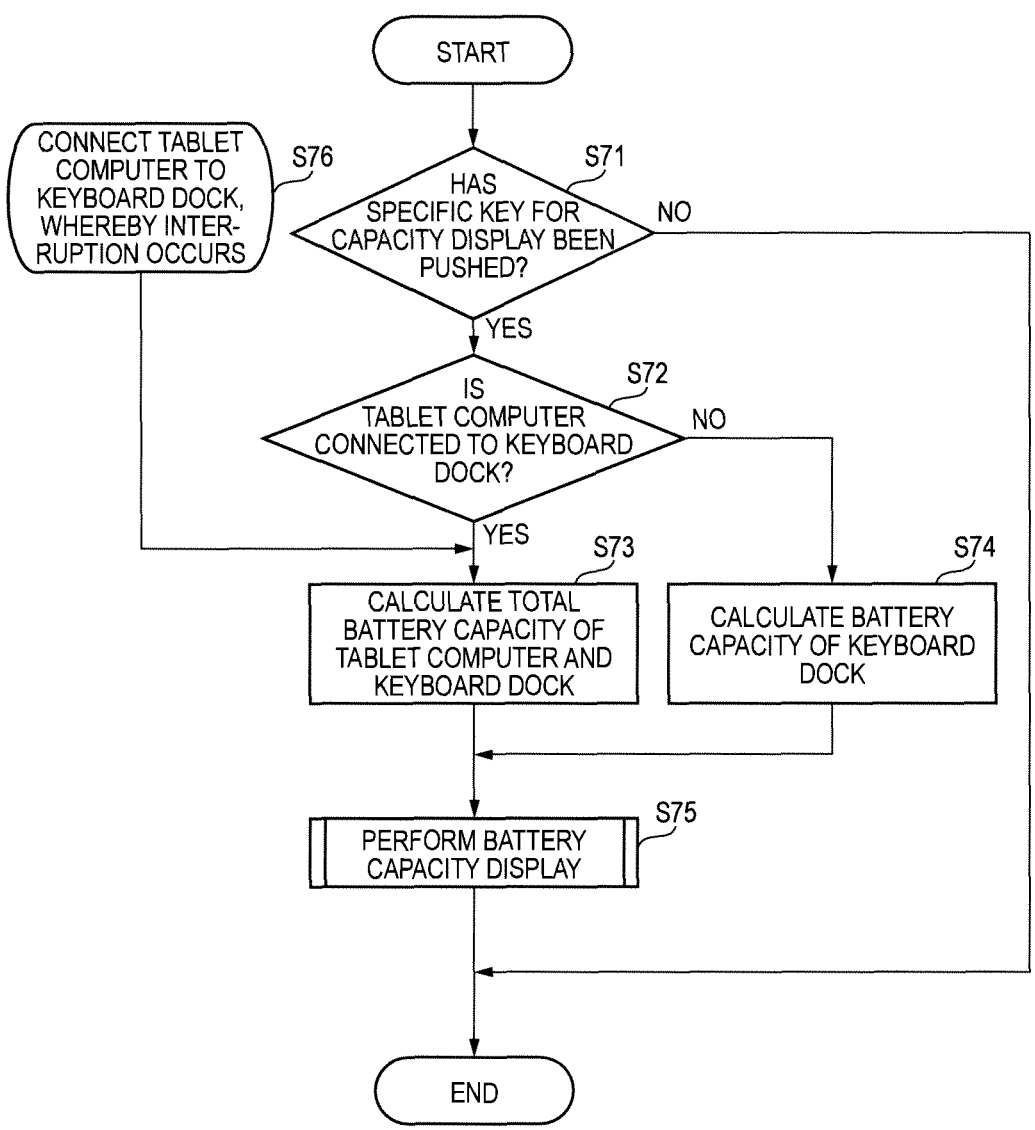
FIG. 7 is a flow chart for explaining an operation of the embodiment.

FIG. 7 is a flow chart for explaining an operation of the embodiment.

In STEP S71, the EC/KBC 301 determines whether a specific key of the keyboard KB has been pushed by a user, whereby capacity (residual capacity) display has been instructed. If the result of this determination is "Yes", the EC/KBC 301 proceeds to STEP S72; whereas, if the result of this determination is "No", the EC/KBC 301 finishes the flow.

In STEP S72, the EC/KBC 301 determines whether the tablet computer 1 is connected to the keyboard dock 2. If the result of this determination is "Yes", the EC/KBC 301 proceeds to STEP S73; whereas, if the result of this determination is "No", the EC/KBC 301 proceeds to STEP S74.

In STEP S73, the EC/KBC 301 calculates the sum of the battery capacities of the tablet computer 1 and the keyboard dock 2. Then, the EC/KBC 301 proceeds to STEP S75. Of them, the battery capacity of the tablet computer 1 is given by communication between the EC/KBC 301 and the EC/KBC 110 through the IIC interface.

Here, the sum may be calculated by an operation like simple averaging of percentages, or may be calculated using weighted averaging or the like. In a case where the sum of the fully charged values of two batteries is set as a denominator and the sum of the residual capacities of the batteries is set as a numerator, whereby a percentage is obtained, if the batteries share electric power as shown in FIG. 5, a value according to the actual feeling of the user is obtained.

In STEP S74, the EC/KBC 301 calculates the battery capacity of the keyboard dock 2. Then, the EC/KBC 301 proceeds to STEP S75.

In STEP S75, the EC/KBC 301 performs a battery capacity display subroutine. Then, the EC/KBC 301 finishes the flow.

In a case where the user connects the tablet computer 1 to the keyboard dock 2 in STEP S76, whereby an interruption occurs, the EC/KBC 301 proceeds to STEP S73. Also, STEP S71 may be activated regularly, for example, by events such as timer interruptions which occur at intervals of a predetermined time.

Figure 8:
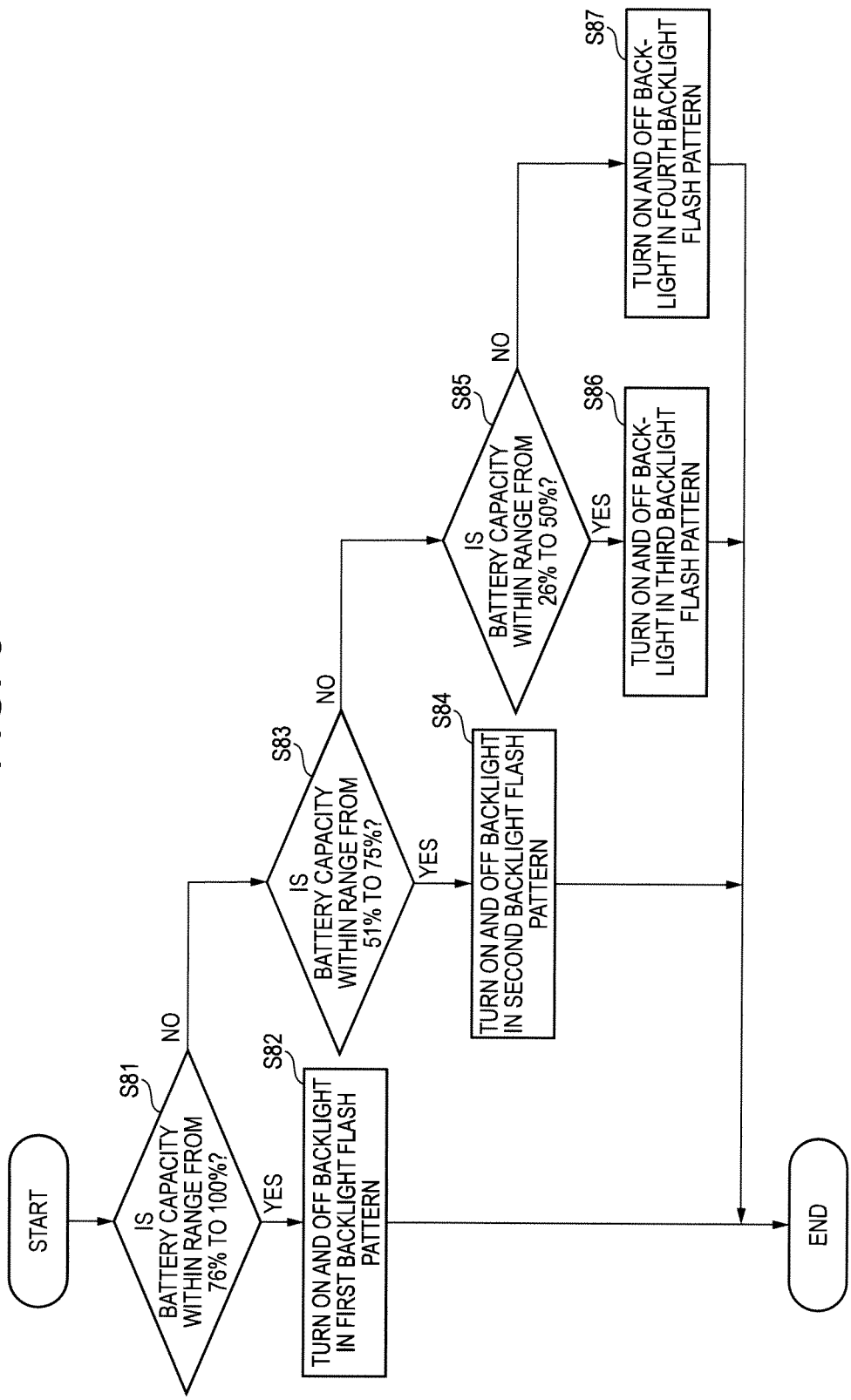
FIG. 8 is another flow chart for explaining the operation of the embodiment.

FIG. 8 is another flow chart for explaining the operation of the embodiment. This flow chart corresponds to the process of the battery capacity display subroutine of FIG. 7.

First, in STEP S81, the EC/KBC 301 determines whether the battery capacity is within a range from 76% to 100%. If the result of this determination is "Yes", the EC/KBC 301 proceeds to STEP S82; whereas, if the result of this determination is "No", the EC/KBC 301 proceeds to STEP S83.

In STEP S82, the EC/KBC 301 turns on and off the backlight in a first backlight flash pattern. This pattern is a pattern in which the backlight is kept in the ON state for one second, four times, at intervals of an OFF period of 0.5 seconds, as shown in (a) of FIG. 6. Then, the EC/KBC 301 finishes the flow.

In STEP S83, the EC/KBC 301 determines whether the battery capacity is within a range from 51% to 75%. If the result of this determination is "Yes", the EC/KBC 301 proceeds to STEP S84; whereas, if the result of this determination is "No", the EC/KBC 301 proceeds to STEP S85.

In STEP S84, the EC/KBC 301 turns on and off the backlight in a second backlight flash pattern. This pattern is a pattern in which the backlight is kept in the ON state for one second, three times, at intervals of an OFF period of 0.5 seconds, as shown in (b) of FIG. 6. Then, the EC/KBC 301 finishes the flow.

In STEP S85, the EC/KBC 301 determines whether the battery capacity is within a range from 26% to 50%. If the result of this determination is "Yes", the EC/KBC 301 proceeds to STEP S86; whereas, if the result of this determination is "No", the EC/KBC 301 proceeds to STEP S87.

In STEP S86, the EC/KBC 301 turns on and off the backlight in a third backlight flash pattern. This pattern is a pattern in which the backlight is kept in the ON state for one second, twice, at intervals of an OFF period of 0.5 seconds, as shown in (c) of FIG. 6. Then, the EC/KBC 301 finishes the flow.

In STEP S87, the EC/KBC 301 turns on and off the backlight in a fourth backlight flash pattern. This pattern is a pattern in which the backlight is kept in the ON state for one second, as shown in (d) of FIG. 6. Then, the EC/KBC 301 finishes the flow.

Figures 9A, 9B:
FIGS. 9A and 9B are views for explaining an IIC ($I^2C$) interface which is used in the embodiment.

FIGS. 9A and 9B are views for explaining the above mentioned IIC interface. An IIC interface bus (IIC-BUS) is composed of a communication line for a clock pulled up and output from the master device and a communication line for bidirectional data communication between the master device and the slave device.

FIG. 9A is a view illustrating a configuration example of a slave address. The slave address has a length of 8 bits, and the most significant 4 bits are fixed according to the kind of the device. Also, a case where the least significant bit is 0 represents write, and a case where the least significant bit is 1 represents read. Therefore, bits 1 to 3 are actually used as the slave address.

FIG. 9B is a view schematically illustrating timings of the two lines, and as shown on the upper side, if a signal in the data line transitions to a low level, transmission starts, and data is transmitted from the most significant bit, and if the signal in the data line transitions to a high level, transmission stops. The timing of the corresponding clock line is as shown on the lower side. FIG. 9B shows an example of 1-byte transmission. However, data transmission and ACK transmission can be repeated a plurality of times until transmission stops. In this case, the first byte may be the slave address and the other bytes may be communication contents.

By the other bytes, the EC/KBC 301 acquires numerical data representing the percentage of the battery capacity from the gas gauge IC included in the battery B2. The EC/KBC 110 also acquires numerical data representing the percentage of the battery capacity from the gas gauge IC included in the battery B1.

Second Embodiment

A second embodiment according to the present invention will be described with reference to FIGS. 1 to 9. Parts common to the first embodiment will not be described. In the first embodiment, battery capacity display based on the backlight flash patterns is performed as described with reference to FIG. 8. However, in the present embodiment, LED pattern display is performed.

The EC/KBC 301 turns on all of four LEDs LD included in a figure area having, for example, a battery shape as shown in (a) of FIG. 6. As the sum of the residual capacities of the batteries decreases, the number of LEDs which are turned on decreases by one at a time as shown in (b), (c), and (d) of FIG. 6. It is preferable to dispose the battery-shaped figure area in a front portion of the keyboard dock 2 which can be easily seen by the user.

Also, the present invention is not limited to the above described embodiments, and can be variously modified without departing from the scope thereof. For example, in a state where the OS of the tablet computer is not active, pattern display based on the residual capacity of the battery of the tablet computer (without summing up the residual capacity of the battery of the tablet computer and the residual capacity of the battery of the expansion unit) as an option according to user's need may be performed.

Also, the plurality of constituent elements disclosed in the above described embodiments can be combined appropriately, whereby it is possible to form various inventions. For example, from all constituent elements shown in the embodiments, several constituent elements may be eliminated. Furthermore, constituent elements according to any other embodiments may be appropriately combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
an expansion unit that has a first battery;
a first controller that performs power management of the first battery;
a main body that has a second battery;
a second controller that performs power management of the second battery; and
a display that displays a residual capacity of the first and second batteries,
wherein the first controller acquires the residual capacity of the second battery from the second controller, sums up the residual capacity of the first battery and the residual capacity of the second battery, and controls the display such that the display performs pattern display.

2. The electronic apparatus according to claim 1, wherein:
in a state where an OS of the main body is not active, the first controller acquires the residual capacity of the second battery from the second controller.

* * * * *